US010732704B2

(12) United States Patent
Vavilala et al.

(10) Patent No.: US 10,732,704 B2
(45) Date of Patent: *Aug. 4, 2020

(54) SELECTION OF POWER IN POWER OVER ETHERNET SYSTEMS

(71) Applicant: Cisco Technology, Inc., San Jose, CA (US)

(72) Inventors: Krishna Kumar Vavilala, Bangalore (IN); Ahmed Faraz, Saharanpur (IN); Saravanan M. K, Bangalore (IN); Sachin Modi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/872,375

(22) Filed: Jan. 16, 2018

(65) Prior Publication Data

US 2018/0136714 A1 May 17, 2018

Related U.S. Application Data

(63) Continuation of application No. 14/845,165, filed on Sep. 3, 2015, now Pat. No. 9,874,930.

(51) Int. Cl.
*G06F 1/26* (2006.01)
*G06F 1/3296* (2019.01)
*H04L 12/10* (2006.01)

(52) U.S. Cl.
CPC ............ *G06F 1/3296* (2013.01); *G06F 1/266* (2013.01); *H04L 12/10* (2013.01)

(58) Field of Classification Search
CPC ... G06F 1/00; G06F 1/26; G06F 1/266; H04L 12/10
See application file for complete search history.

(56) References Cited

U.S. PATENT DOCUMENTS

| 8,793,511 | B1 | 7/2014 | Bishara |
| 8,898,446 | B2 | 11/2014 | Ronen et al. |
| 10,060,965 | B1* | 8/2018 | Skinner ............... G01R 31/086 |
| 2008/0114997 | A1 | 5/2008 | Chin |
| 2008/0256371 | A1* | 10/2008 | Diab ...................... H04L 12/10 |
| | | | 713/300 |
| 2009/0164805 | A1 | 6/2009 | Diab et al. |
| 2013/0187632 | A1 | 7/2013 | Ohana |
| 2014/0195831 | A1* | 7/2014 | Hamdi ................. G06F 1/3296 |
| | | | 713/320 |

(Continued)

OTHER PUBLICATIONS

Maniktala, Sanjaya. "Chapter 4, Classification." Power over Ethernet Interoperability. New York, NY: McGraw-Hill, 2013. N. pag. Web. Apr. 21, 2017.

(Continued)

*Primary Examiner* — Jaweed A Abbaszadeh
*Assistant Examiner* — Brian J Corcoran
(74) *Attorney, Agent, or Firm* — Patterson + Sheridan, LLP (57) ABSTRACT

Embodiments described herein include a Power over Ethernet (PoE) enabled device that uses 2-event classification when allocating power to coupled powered devices (PDs). If the 2-event classification is successful, power sourcing equipment (PSE) on the PoE device allocates a maximum power allotment to the PD. Once powered on, the PD may determine it does not require the maximum power allotment and negotiate a reduction in the power allotted to the PD.

18 Claims, 5 Drawing Sheets

(56) References Cited

U.S. PATENT DOCUMENTS

| | | |
|---|---|---|
| 2014/0245054 A1 | 8/2014 | Hamdi et al. |
| 2015/0026496 A1 | 1/2015 | Liu et al. |
| 2017/0068307 A1 | 3/2017 | Vavilala et al. |
| 2018/0139063 A1* | 5/2018 | Yseboodt ............. G05B 19/042 |

OTHER PUBLICATIONS

Law, David J. et al., IEEE Standard for Information technology—Telecommunications and information exchange between systems—Local and metropolitan area networks—Specific requirements: Part 3: Carrier Sense Multiple Access with Collision Detection (CSMA/CD) Access Method and Physical Layer Specifications: Amendment 3: Data Terminal Equipment (DTE) Power via the Media Dependent Interface (MDI) Enhancements, Oct. 30, 2009, IEEE, New York, United States.

* cited by examiner

SELECTION OF POWER IN POWER OVER ETHERNET SYSTEMS

CROSS-REFERENCE TO RELATED APPLICATIONS

This application is a continuation of co-pending U.S. patent application Ser. No. 14/845,165, filed Sep. 3, 2015. The aforementioned related patent application is herein incorporated by reference in its entirety.

TECHNICAL FIELD

Embodiments presented in this disclosure generally relate to classifying Power-over-Ethernet (PoE) systems. More specifically, embodiments disclosed herein use a two-event classification technique when powering on powered devices.

BACKGROUND

Some network devices (e.g., routers, switches, servers, and the like) include power sourcing equipment (PSE) that enables the network device to provide both data and power over the same Ethernet cable to a powered device (PD). A recent trend is to communicatively couple consumer products (e.g., appliances, lighting fixtures, exercise machines, etc.), environmental controls (e.g., thermostats, meters, pumps, etc.), and many other types of components to the Internet. Providing such connectivity is referred to generally as the Internet of Things, or more broadly as the Internet of Everything. One example of achieving this connectivity is by using network devices to both provide a data connection as well as DC power to the consumer products, environmental controls, and the like.

Before powering up the PDs, the network device classifies the PDs in order to determine the power to be initially allotted to the PD. This classification typically occurs using layer 1 (i.e., PHY layer) communication signals. The initial allotted power depends on the class or type of the PD coupled to the PSE. Once the classification technique is complete, the PD can power up using the allotted power.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure includes is a PoE enabled device that includes PSE configured to provide DC power to a PD and a PoE manager. The PoE manager is configured to perform a first classification event associated with the PD and perform a second classification event associated with the PD. In response to determining the first and second classification events were successful, the PoE manager is configured to allocate a maximum power allotment to the PD, wherein the maximum power allotment is a predefined value providing the maximum amount of power that the PSE can allocate to any one PD. After allocating the maximum power allotment, the PoE manager is configured negotiate with the PD to reduce power allotted to the PD.

Another embodiment of the present disclosure is a method that includes performing a first classification event associated with a PD and performing a second classification event associated with the PD. In response to determining the first and second classification events were successful, the method includes allocating a maximum power allotment to the PD, wherein the maximum power allotment is a predefined value providing the maximum amount of power that a PSE can allocate to any one PD. After allocating the maximum power allotment, the method includes negotiating with the PD to reduce power allotted to the PD.

Another embodiment of the present disclosure is PoE enabled device that includes PSE configured to provide DC power to a PD and a PoE manager configured to determine that the PSE has sufficient available power to allot a maximum power allotment to the PD, where the maximum power allotment is a predefined value providing the maximum amount of power that the PSE can allocate to any one PD. Upon determining the PSE has sufficient available power, the PoE manager is configured to perform a two-event classification of the PD, allocate the maximum power allotment to the PD, and negotiate with the PD to reduce power allotted to the PD. Upon determining the PSE does not have sufficient available power, the PoE manager is configured to perform a one-event classification of the PD and allocate a power level to the PD based on a class of the PD identified during the one-event classification.

EXAMPLE EMBODIMENTS

Embodiments described herein include a PoE enabled device that uses 2-event classification when allocating power to coupled PDs. If the 2-event classification is successful, PSE on the PoE device allocates a maximum power allotment to the PD. Once powered on, the PD may determine it does not need this much power and uses a link layer discovery protocol (or a vendor-specific variant thereof) to negotiate a reduction in the power allotted to the PD.

One advantage of using the 2-event classification is that the PD does not have to monitor its power consumption when first powering on. By contrast, when using a 1-event classification, the PoE enabled device allocates power to the PD based on identifying a class or type of the PD (e.g., class 0, 1, 2, 3, 4, etc.) where each class corresponds to a different power level. For example, the PSE may initially allocate 15 W to a class 4 PD. When powering on, power capping logic in the PD ensures that the power drawn by the PD does not exceed the power initially allocated by the PoE device. However, developing software or firmware to monitor and limit the power drawn by the hardware elements in the PD is complicated. If not done properly, the PD may draw more power than it is allocated. The PSE, which includes circuitry for monitoring the power drawn by the PDs, may stop transmitting power to the PD if the PD exceeds its allocated limit. Thus, if the power capping logic is not designed properly, the PSE may stop transmitting power to the PD before the PD has a chance to request an increase in its allocated power.

When performing the 2-event classification, the PoE device allocates the maximum amount of power to the PD—e.g., 30 W. Thus, even if the power capping logic in the PD is unable to accurately track the PD's power usage, so long as the usage does not exceed the maximum power allotment, the PSE will not power down the PD. Once the PD is powered on and operating, the PD can then negotiate a reduction in its power allotment with the PoE device—e.g., reducing the allocated power from 30 W to 15 W.

In one embodiment, the PoE device determines whether the PSE has sufficient available power to allocate the maximum power allotment to the PD before performing the 2-event classification. For example, consider multiple PDs coupled to the PoE device, each relying on the PSE for DC power. Because the PSE can allocate only a fixed amount of power, the PSE may not be able to allocate the maximum power allotment to any new PDs that are coupled to the PSE. For example, the PSE may have a total power budget of 80 W but has already allocated 60 W of power to other PDs coupled to the PoE device. The PoE device may perform the 2-event classification only if the PSE has sufficient power to allocate the maximum power allotment to the new PD. In the previous example, the PSE has only 20 W of remaining power to allocate, and thus, does not have enough available power to allocate the maximum power allocation (e.g., 30 W) to a new PD. As such, the PoE device may instead perform the 1-event classification or refuse to power up the PD until the PSE can allocate the maximum power allotment.

Figure 1:
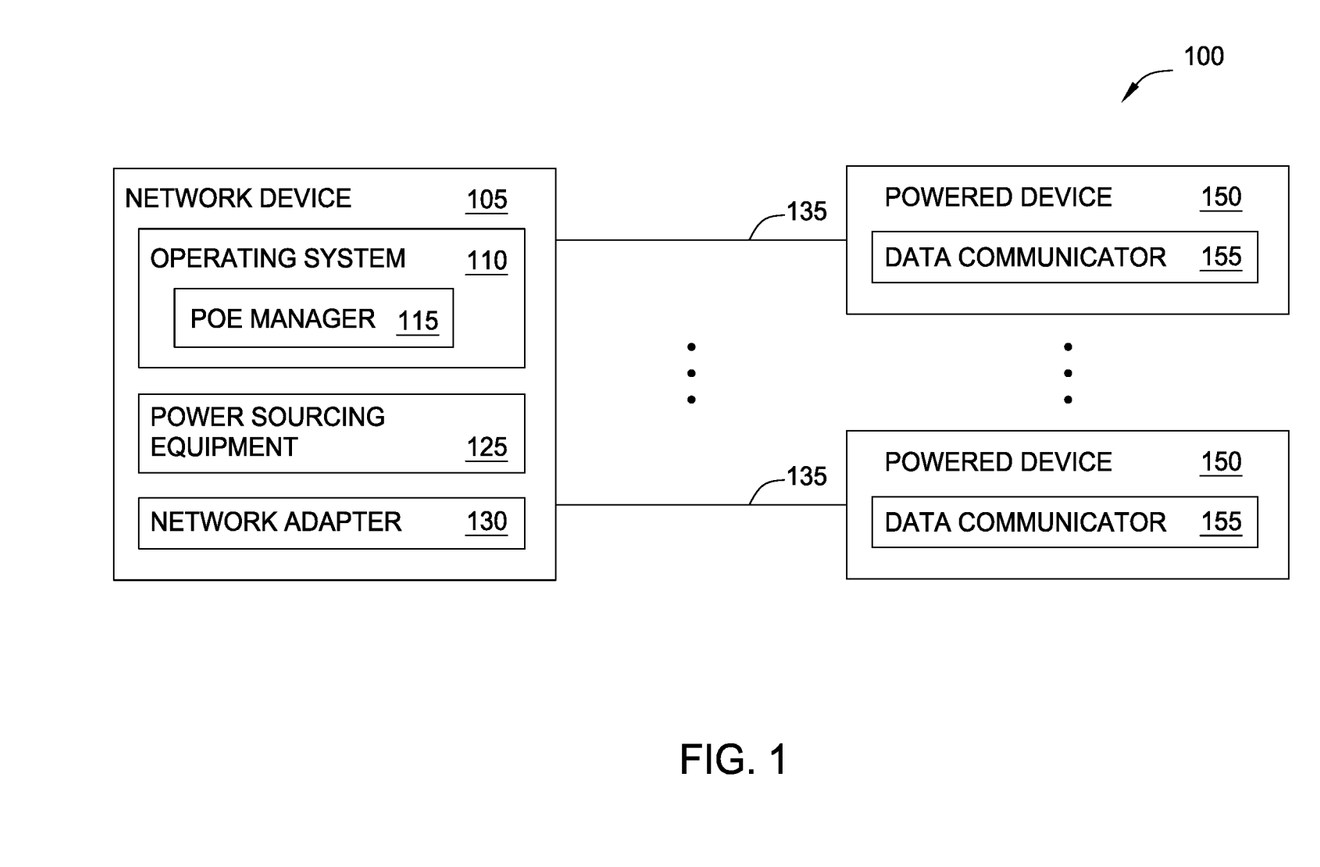
FIG. 1 illustrates a PoE system including a network device and multiple PDs, according to one embodiment described herein.

FIG. 1 illustrates a PoE system 100 including a network device 105 and PDs 150, according to one embodiment described herein. As shown, the network device 105 is coupled to a plurality of PDs 150 each of which represents any type of device capable of receiving DC power using PoE. For example, the PDs 150 may be consumer products, environmental controls, electronic devices, and the like. As shown, the PDs 150 include a data communicator 155 which enables data communication via Ethernet cables 135. That is, in this embodiment, the network device 105 enables the PDs 150 to communicate with a network (e.g., the Internet) as well as provides power to the PDs 150. Using the data communicators 155, the PDs 150 can receive data packets from, as well as transmit data packets to, the network device 105. In one embodiment, the PoE system 100 is part of the Internet of Everything or the Internet of Things. For example, the PD 150 may be a light fixture in a home. The network device 105 may include an application that turns the light fixture on and off. At sunset, the application may send an instruction to the data communicator 155 that turns the light fixture on. Moreover, when the home owner turns off the light (e.g., when the owner goes to bed) the data communicator 155 may transmit a data message to the network device 105. Although FIG. 1 illustrates that the network device 105 and PDs 150 transmit data messages over the Ethernet cables 135, in other embodiments the network device 105 may provide only power to the PDs 150 using PoE. Furthermore, instead of network device 105 (e.g., a router, switch, etc.), a midspan device may be used to provide DC power and forward data packets to the PDs 150.

The network device 105 includes an operating system (OS) 110, PSE 125, and a network adapter 130. The OS 110 may be any OS capable of performing the functions described herein. The OS 110 may establish a data plane for forwarding data between devices connected to the network device 105. Furthermore, the OS 110 may maintain a control plane to manage the flow of the data traffic in the data plane. The OS 110 includes a PoE manager 115 for performing PoE functions in the network device 105. For example, the PoE manager 115 may perform one of the PoE functions detailed in the IEEE 802.3af or 802.03at standards such as allocating the power supplied by the PSE 125 amongst the PDs 150.

The PSE 125 includes a physical power supply that is, at least in one embodiment, controlled by the PoE manager 115 to deliver power to the PDs 150. The PSE 125 may include an AC-DC converter that converts the AC power into DC power. As shown, the PSE 125 provides DC power to each of the PDs via the Ethernet cables 135. The PSE 125 may include circuitry for monitoring the power drawn by each of the PDs 150 to ensure the PDs 150 do not draw more power than they are allotted. The power supply (or supplies) in the PSE 125 may have a maximum, total power capacity that can be allocated by the PoE manager to the PDs 150. In addition to this total power limitation, a per PD power limit may be enforced. That is, the PSE 125 may provide up to a maximum power allotment to any one of the PDs 150. For example, even though the PSE 125 has a total power capacity of 100 W, the PoE manager 115 may be configured to allocate up to 30 W of power to each PD 150. Thus, if each PD 150 was allocated the maximum power allotment, at most three PDs 150 could be powered by the network device 105 (with 10 W remaining). However, as discussed below, the PDs 150 and the PoE manager 115 can use a negotiation procedure to change the initial power allocation. For example, if the PoE manager 115 initially allocates the maximum power allotment to a PD 150, once powered on, the PD 150 can negotiate a lower power allotment. This negotiation can change the available power budget of the PSE 125 and may increase the total number of PDs 150 that can be powered by the PSE 125.

In addition to providing power on the Ethernet cables 135, the network adapter 130 may transmit and receive data signals on the cables 135. Thus, network device 105 may mix the data signal with power signals in order to simultaneously deliver power and data messages to the PDs 150 using the cables 135. However, in other embodiments, the cables 135 may be used to deliver only power, but not data, to the PDs 150.

Figure 2:
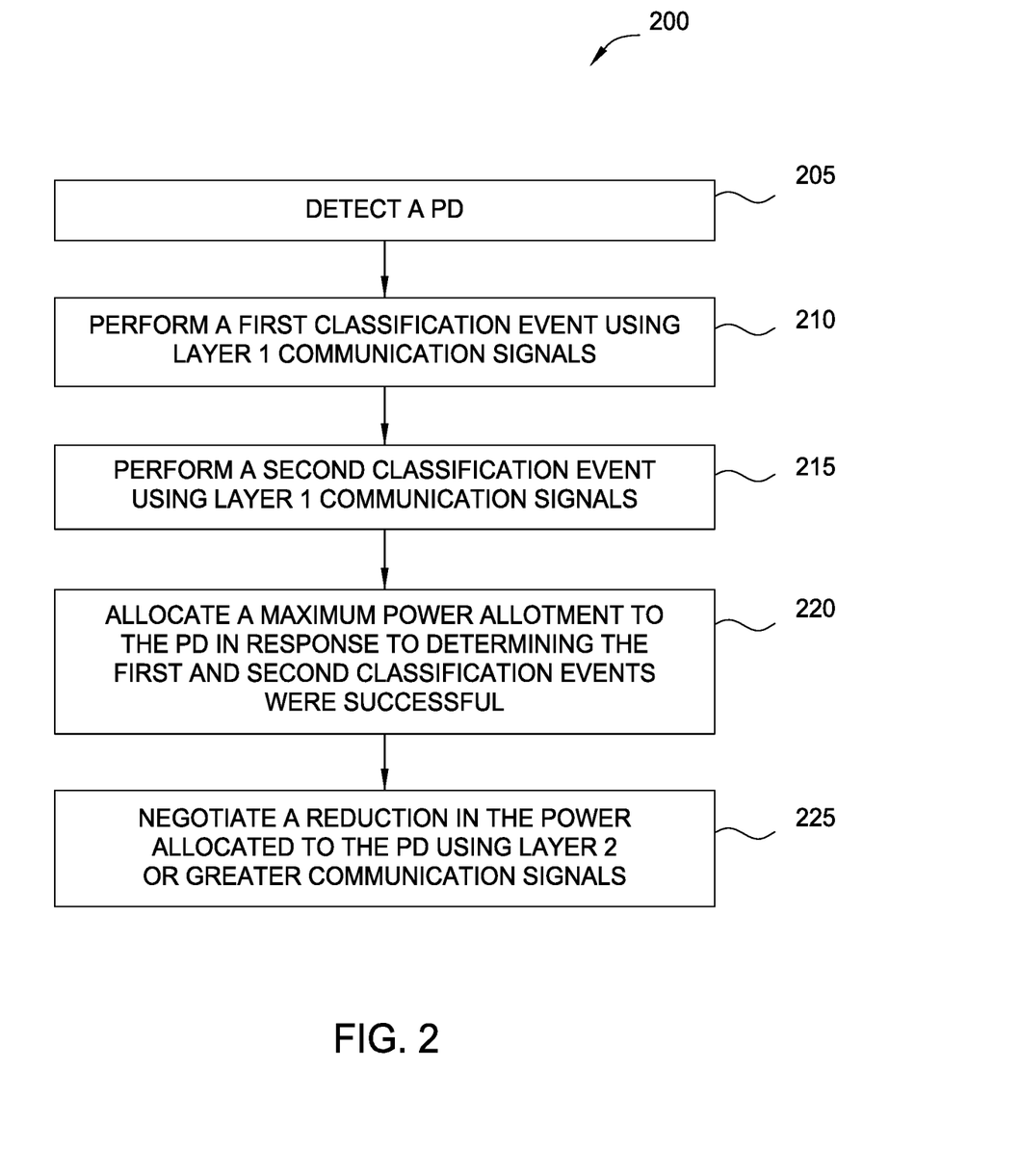
FIG. 2 is flow chart for classifying a PD, according to one embodiment described herein.

FIG. 2 is flow chart 200 for classifying a PD, according to one embodiment described herein. At block 205, a PoE manager, which is located on the same PoE device as a PSE, detects a PD device coupled to the network device or midspan device. As above, the PD may be coupled to the PoE device (e.g., a network device or midspan device) using a cable such as an Ethernet cable. The PoE manager may monitor ports on the PoE device used to couple the device to Ethernet cables. In one embodiment, the PoE manager uses the detection technique discussed in the IEEE 802.3at or 802.3af standards to determine whether a PD is PoE enabled. To do so, the PSE may generate a fixed voltage which results in a current flowing through a signature resistor in the PD. By measuring the current, the PoE manager can determine the value of the signature resistor in the PD, and based on this value, determine if the PD is PoE enabled.

At block 210, the PoE manager performs a first classification event using layer 1 communication signals. Stated differently, the PoE manager uses the PSE to provide signals at the physical (PHY) layer to classify the PD. In one embodiment, a PoE enabled PD may be classified into different types or classes—e.g., Class 0, 1, 2, 3, etc. During the first classification event, the PSE may provide a fixed voltage which powers a current source on the PD. By measuring the current generated by the current source, the PSE can identify the class of the PD. However, if the first classification event fails, in one example, the PoE manager does not allocate any power to the PD—i.e., the PD is not powered on.

At block 215, the PoE manager performs a second classification event again using layer 1 communication signals. In one embodiment, the second classification event is performed only if the PoE manager was able to successfully identify the class of the PD during the first classification event. During the second classification event, the PoE manager may confirm that the PD is compatible with the IEEE 802.3at standard. Put differently, the PoE manager confirms that the PD is a PoE+ device.

If the PD is a PoE+ device, during the second classification event, the PSE uses layer 1 communication signals to inform the PD that the PSE has allocated the maximum power allotment to the PD. Stated differently, the PSE informs a state machine on the PD that the PD can draw the maximum power allotment when powering up. For example, if the first classification event was performed but not the second classification event, then the PoE manager allocates power to the PD according to its class. For instance, if the PD is a class 0 PD, the PoE manager allocates 7 W to the PD, if the PD is a class 1 PD, the PoE manager allocates 10 W to the PD, and so forth. However, performing the second classification event informs the PD that it is allocated the maximum power allotment—e.g., 30 W—rather than the specific power allotment corresponding to the class of the PD. Thus, regardless whether the PD is a class 0, 1, 2, 3, or 4, the PD is allocated the maximum power allotment.

As used herein, the maximum power allotment is a predefined maximum amount of power that the PSE can assign or allocate to any one PD. Even if the PSE has available power and can provide more than the maximum power allotment to a PD, the PoE manager will not increase the power allotment to the PD beyond the maximum power allotment. For example, if the PSE is currently powering only one PD and has the ability to generate 100 W of power, the PoE manager permits the PD to draw at most the maximum power allotment—e.g., 30 W. The embodiments herein assume the maximum power allotment is 30 W but this value may vary. For example, the maximum power allotment may be different in past or future PoE standards.

In one embodiment, the first and second classification events are part of the 2-event classification defined in the IEEE 802.3at standard. However, this disclosure is not limited to this standard; instead, the first and second classification events may be used in any PoE system where classification events are used to determine an initial power to allocate to a PD.

At block 220, the PoE manager allocates the maximum power allotment to the PD in response to determining that the first and second classification events were successful. However, if the second classification event fails, the PoE manager may determine that the PD is not a PoE+ device and allocate power to the PD based on the class type identified during the first classification event rather than the maximum power allotment. Assuming both classification events are successful, at block 220 the PoE manager determines the PD is a PoE+ device, while the state machine in the PD knows it is allocated the maximum power allotment.

In one embodiment, the PD includes power capping logic (which may be part of the state machine) that monitors the power drawn by the various components in the PD. However, by performing the second classification event and allocating the maximum power allotment, the power capping logic may not need to monitor the power usage of the PD when powering on the PD's hardware and software modules. In contrast, if the PD was allocated an initial power allotment corresponding to its class type (e.g., 7 W for class 0, 10 W for class 1, and so forth), the power capping logic monitors the hardware and software modules to ensure the PD does not draw power that exceeds this initial power allotment. In one embodiment, the power capping logic permits only certain hardware or software modules to operate after the initial power allotment has been made to maintain the power usage of the PD below the initial power allotment. As discussed above, designing power capping logic to monitor the power drawn by the hardware and software modules in the PD is difficult. If the power capping logic inadvertently permits the power drawn by the PD to exceed the initial power allotment, the PoE manager may instruct the PSE to stop providing power to the PD, forcing the PD to turn off.

In contrast, because the PoE manager initially allocates the maximum power allotment to the PD when the PD is connected to the PSE, the likelihood that the PD will exceed this initial allotment is greatly reduced relative to allocating an initial allotment correspond to the class type of the PD. In one embodiment, the PD does not use the power capping logic once the state machine determines the PoE manager has allocated the maximum power allotment to the PD. The state machine may permit all the hardware and software modules in the PD to begin operating without considering whether doing so will exceed the maximum power allotment. For example, the PD may have been designed to ensure that the total combined power usage of the various components in the PD never exceeds the maximum power allotment. However, in another embodiment, the state machine may still use the power capping logic to monitor the power usage of the PD to ensure the power usage does not exceed the maximum power allotment. Even if the power capping logic cannot perfectly monitor and limit the power usage in the PD, because the power allotment of the PD is initially set to the maximum power allotment, the likelihood the PD inadvertently exceeds its allotted power is greatly reduced.

At block 225, the PoE and the PD negotiate a reduction in the power allocated to the PD using layer 2 or greater communication signals. In one embodiment, block 225 occurs after the PD is operational and data communication (i.e., layer 2 or greater) is established between the PoE manager and the PD. In contrast to the detection and classification events at blocks 205, 210, and 215, the negotiation performed at block 225 occurs using data signals (e.g., logical bits) embodied in layer 2 or greater communication signals rather than layer 1 communication signals which rely on measuring discrete changes in voltages and/or currents. One example of a data communication technique for performing this negotiation is the Link Layer Discovery Protocol (LLDP). However, other variants of this protocol are also suitable, such as vendor-specific discovery protocols (e.g., Cisco Discovery Protocol or Microsoft's Link Layer Topology Discovery). These protocols use layer 2 or greater network traffic to change the power allotted to the PD.

In one embodiment, the PD initiates the request to reduce its allocated power. Once operational, the state machine in the PD can determine that the hardware and software modules do not need the maximum power allotment to function properly. For example, the PD may be allocated 30 W, but only draws 20 W. Using LLDP, the PD transmits a message using the Ethernet cable to the PoE manager which processes the request and changes the power allotted to the PD—e.g., reduces the power allotment from 30 W to 20 W. If, for example, a USB device is plugged into the PD thereby increasing its power needs above its current allocated power, the PD may transmit another message to the PoE manager to increase its power allotment. If the PSE has additional power available, the PoE manager grants the request which permits the PD to draw additional power to power the USB.

In another embodiment, the PoE manager initiates the request to reduce the power allocated to the PD. For example, a new PD may be coupled to the PSE, but the PSE may not have enough available power to supply the maximum power allotment to the new PD—e.g., the PSE may have only 25 W available. Instead of refusing to power up the PD (or allocating the PD less than the maximum power allotment), the PoE manager may transmit a request to a PD already coupled to the PSE that is still allotted the maximum power allotment. The PoE manager may inform the PD that the PoE manager is going to lower the power allocated to the PD. If the PD is drawing less power than the lower power allotment indicated by the PoE manager, then the PD does not need to change its operational state. However, if the PD draws more power than the lower power allotment, the PD may need to turn off certain functions or disable different software or hardware modules to reduce its power consumption. Once the PD confirms it is drawing power at, or below, the new lower power allocation, the PoE manager can allocate the newly available power to the new PD which may enable the PSE to provide the maximum power allotment to the PD.

Figure 3:
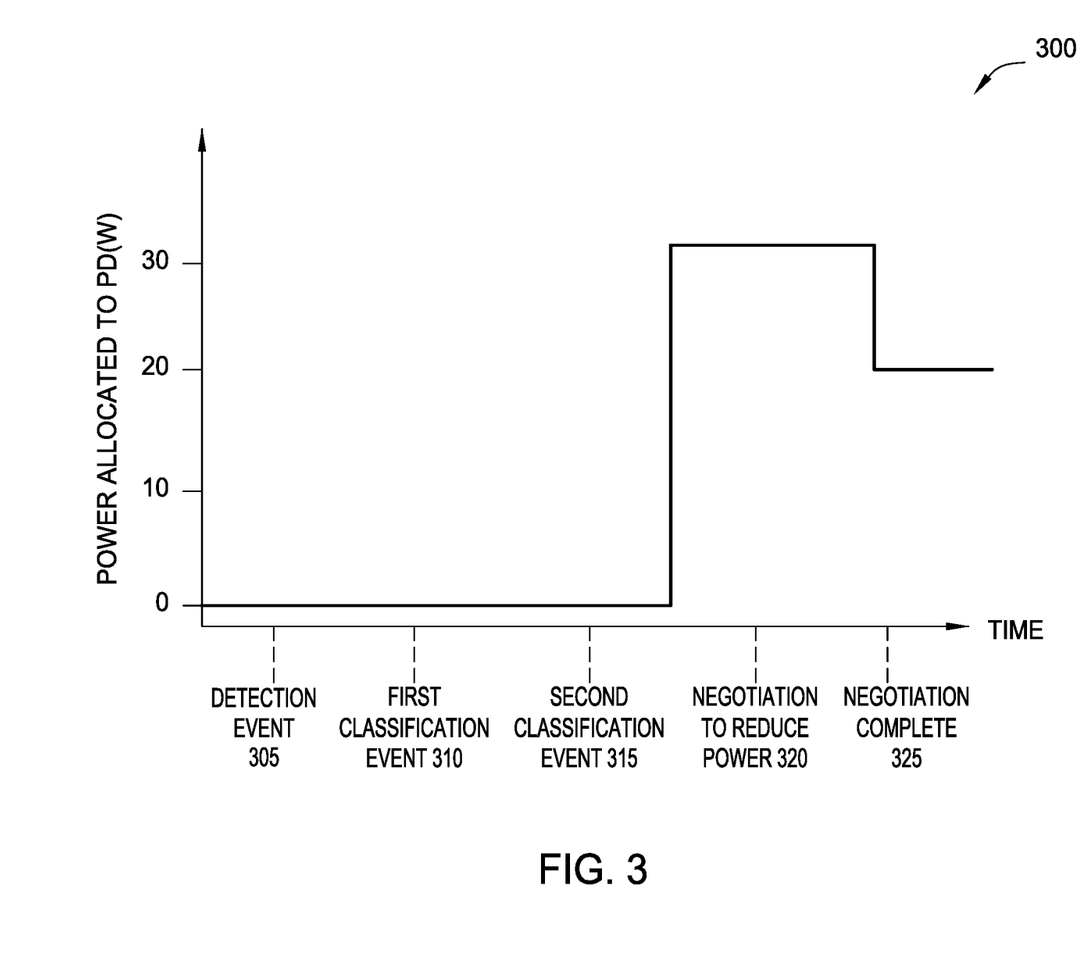
FIG. 3 is chart illustrating multiple events performed when allocating power to a PD, according to one embodiment described herein.

FIG. 3 is chart 300 illustrating multiple classification events performed when a PD is first coupled to a PSE, according to one embodiment described herein. The y-axis of chart 300 illustrates the power allocated to a PD, while the x-axis illustrates the various events that determine the power allocated to the PD. The spacing between the events in the x-axis is not intended to indicate the amount of time required to perform each of the events as some events may take longer than others.

At time 0 (e.g., the leftmost portion of the x-axis), the PD is not allocated any power. However, this does not mean the PSE does not supply some (nominal) amount of power to the PD. For example, during a detection event 305, the PSE drives a voltage on a cable coupling the PD to the PSE which generates a current through a resistor (e.g., a signature resistor) in the PD. As discussed in block 205 of method 200, the PoE manager can measure this current to identify the PD as a PoE enabled device.

If the PD is a PoE device, the PoE manager performs a first classification event 310 and a second classification event 315 which were discussed at blocks 210 and 215 in method 200. Similar to the detection event 305, the PSE supplies voltage and/or current to the PD to perform the classification events 310, 315, although the PoE manager has not yet allocated power to the PD.

Assuming the first and second classification events 310, 315 are successful, the PoE manager allocates the maximum power allotment to the PD—i.e., 30 W. Sometime later, the PoE manager and the PD perform a negotiation event 320 to reduce the power allocated to the PD as discussed in block 225 of method 200. Once the negotiation is complete, at time 325 the PoE manager reduces the power allocated to the PD.

Figure 4:
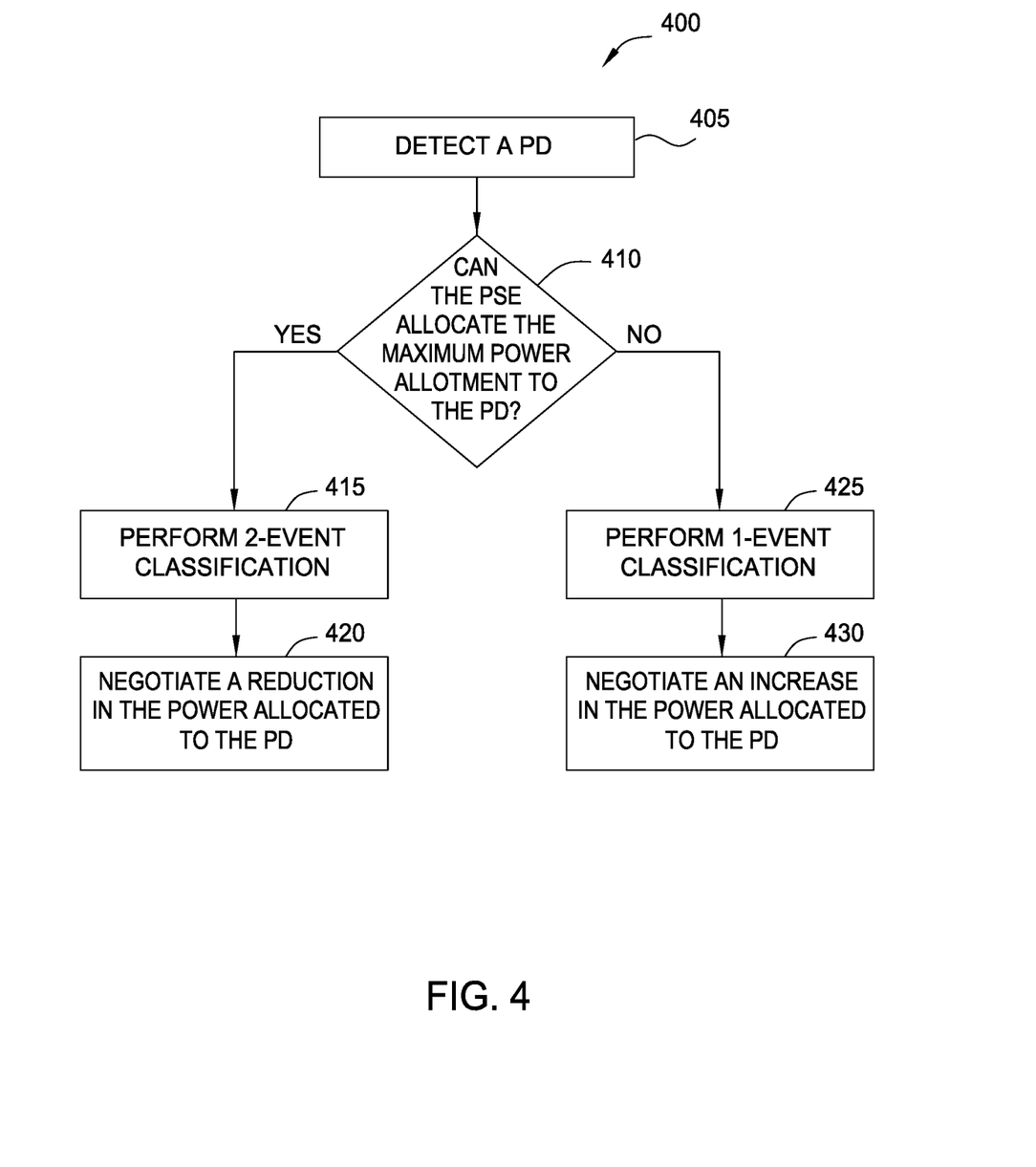
FIG. 4 is a flow chart for classifying PDs using different classification techniques, according to one embodiment described herein.

FIG. 4 is a flow chart 400 for classifying PDs using different classification techniques, according to one embodiment described herein. At block 405, the PoE manager detects a PD which may be the same process as that discussed in block 205 of method 200. Once detected, at block 410, the PoE manager determines whether the PSE can allocate the maximum power allotment to the PD. For example, multiple PDs may be coupled to the PSE which have already been allocated power. As such, the remaining available power budget of the PSE may be less than the maximum power allotment.

If the PSE has enough available power budget to provide the maximum power allotment, at block 415 the PoE manager performs a 2-event classification as described in blocks 210 and 215 of method 200. If the 2-event classification is successful, the PoE manager allocates the maximum power allotment to the PD which permits the PD to become fully operational. At block 420, the PoE manager and PD negotiate a reduction in the power allocated to the PD which may be similar to the techniques discussed at block 225 in method 200. Stated differently, the PoE manager performs the functions described in blocks 415 and 420 only after determining at block 410 that the PSE has sufficient power budget to allocate the maximum power allotment to the detected PD.

If the PSE does not have sufficient power budget, method 400 proceeds to block 425 where the PoE manager performs a 1-event classification. For example, the PoE manager may perform only the first classification event discussed at block 210 of method 200. During the 1-event classification, the PSE provides a voltage to the PD which the PD uses to generate a current. By measuring this current, the PD determines the class type of the PD—e.g., class 0, 1, 2, etc. In one embodiment, each class type corresponds to a different initial power allocation—e.g., 7 W, 10 W, 15 W, etc. Once the PoE manager identifies the class type of the PD, the manager allocates the corresponding power to the PD. As discussed above, the PD may include power capping logic to ensure that the various hardware and software components in the PD do not draw more power than what was initially allocated by the PoE manager. In one embodiment, the 1-event classification and the 2-event classification in blocks 415 and 425 are the 1-event and 2-event classifications described in IEEE 802.3at.

In one embodiment, before allocating the initial power allocation based on the class type identified at block 415, the PoE manager determines whether the PSE can allocate the initial power allocation to the PD. For example, the PSE may not have enough available power budget to allocate the initial power allocation. In response, the PoE manager may request that other PDs reduce their power consumption, or may elect not to allocate any power to the PD.

After allocating the initial power allocation to the PD, at block 430, the PoE manager and PD may negotiate an increase in the power allocated to the PD. For example, the power capping logic in the PD may limit the number of hardware or software modules operating in the PD to keep the power drawn by the PD below the initial power allocation. In order to operate the remaining hardware or software modules, the PD may transmit a request to the PoE manager to increase its power allocation. Assuming the PSE has sufficient available power budget to satisfy the request, the PoE manager grants the PD's request and increases the power allocated to the device.

Figure 5:
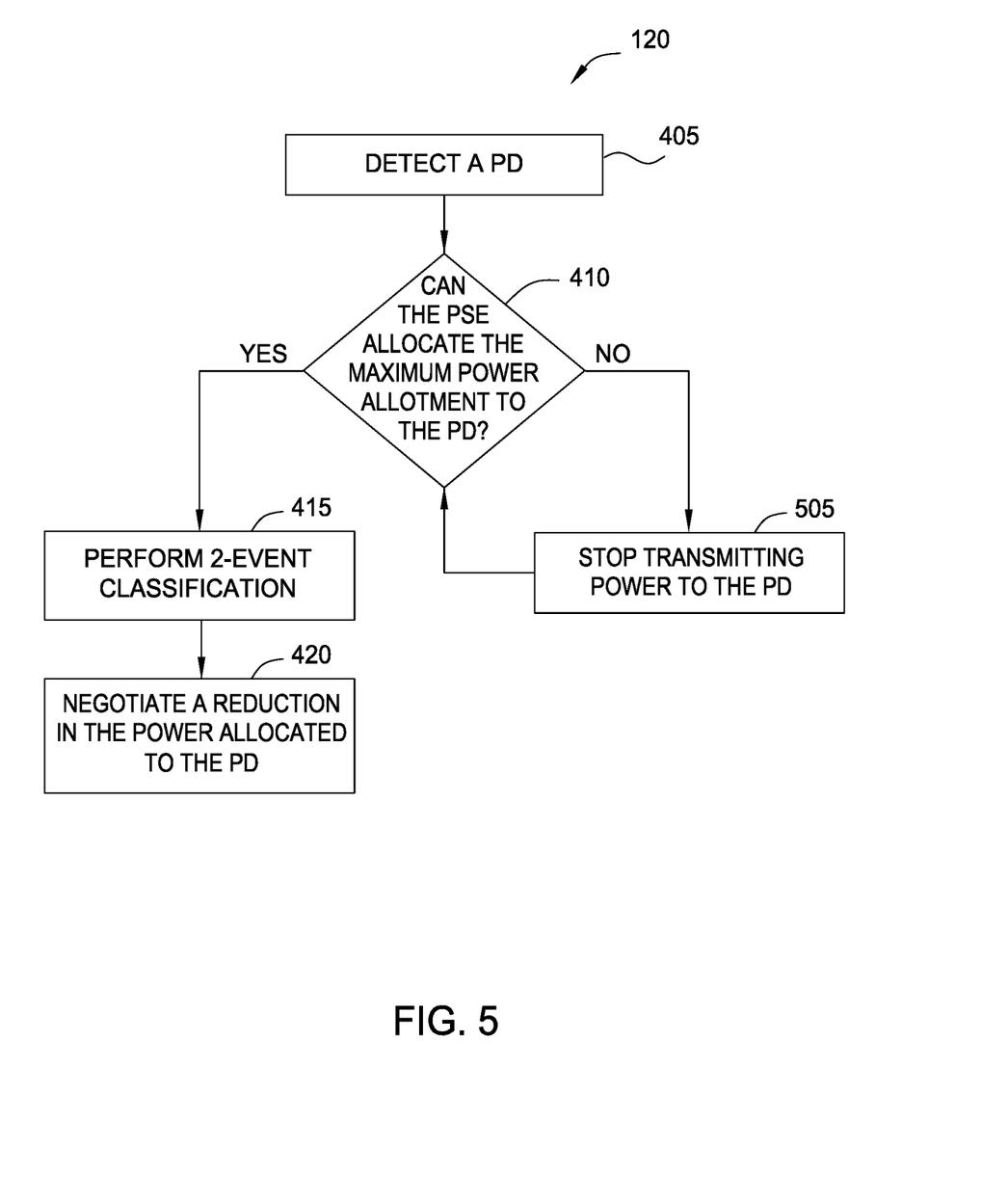
FIG. 5 is a flow chart for classifying PDs using a 2-event classification, according to one embodiment described herein.

FIG. 5 is a flow chart of a method 500 for classifying PDs using a 2-event classification, according to one embodiment described herein. Method 500 includes blocks 405, 410, 415, and 420 which are the same as the blocks illustrated in method 400, and thus, will not be described in detail here. Method 500 differs from method 400 in that the PoE manager does not power up the detected PD if the PSE cannot allocate the maximum power allotment to the PD. That is, if at block 410 the PoE manager determines the PSE does not have sufficient budget to allocate the maximum power allotment, method 500 proceeds to block 505 where the PSE stops transmitting power to the PD 505. In one embodiment, the PoE manager does not perform any type of classification of the PD and instructs the PSE to stop driving any voltage or currents onto the cable connecting the PSE to the PD. As a result, the PD remains unpowered.

Method 500 returns to block 410 where the PoE manager again determines if the PSE can allocate the maximum power allotment to the PD. For example, a PD that was previously connected to the PSE may have been disconnected or powered down, thereby freeing additional power budget. Alternatively, the PoE manager may send requests to one or more PDs already coupled to the PSE requesting that the PDs reduce their power consumption. These request can either be compulsory (i.e., the PDs must lower their power consumption as instructed by the PoE manager) or voluntary (i.e., the PDs permit the PoE manager to reduce their power allocation only if the PDs are consuming less power than they are allocated). If at block 410 the PoE manager determines that the PSE now has available power budget to allocate the maximum power allotment, method 500 proceeds to block 415 where the 2-event classification is performed.

One advantage of using method 500 rather than method 400 is that the PDs used in method 500 may not need to include the power capping logic used in the PDs operated according to method 400. That is, because in method 500 the PoE manager does not allocate an initial power allotment to the PDs based on the class type (which is less than the maximum power allotment), the PDs do not need power capping logic which ensures the PDs do not draw more power than the PDs are allocated when powering up since the likelihood the PDs will draw more than the maximum power allotment is very small. Instead, in method 500, the PoE manager either allocates the maximum power allotment to the PD or the PD remains unpowered. Using PDs that do not contain the power capping logic may mean the PDs operated using method 500 may be cheaper to design and manufacture than the PDs used in method 400.

In contrast, one advantage of using method 400 rather than method 500 is that the PSE can potentially power more PDs. Method 500 only powers a PD if the maximum power allotment is available. In contrast, method 400 powers a PD according to the class of the PD even if the PSE lacks sufficient power to provide the maximum power allotment to the PD. For example, using method 400, if the PSE has 20 W of available power, a class 3 PD can still be allotted 15 W of power and powered on. However, using method 500, this PD would remain unpowered until an additional 10 W of power becomes available.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A Power-over-Ethernet (PoE) enabled device, comprising:
   power sourcing equipment (PSE) configured to provide power to a powered device (PD);
   a PoE manager configured to:
      determine that the PSE has sufficient available power to allocate a predefined maximum power allotment to the PD, wherein the PSE is configured to power multiple PDs simultaneously,
      perform a first and second classification event associated with the PD, based on the determination that the PSE has sufficient available power,
      in response to determining the first and second classification events were successful, allocate the predefined maximum power allotment to the PD, wherein the predefined maximum power allotment is a predefined value providing a maximum amount of power that the PSE can allocate to any one PD, and
      after allocating the predefined maximum power allotment, negotiate with the PD to reduce power allotted to the PD.

2. The PoE enabled device of claim 1, wherein the first and second classification events are performed using layer 1 communication signals, wherein the negotiation with the PD is performed using layer 2 or greater communication signals.

3. The PoE enabled device of claim 1, where in the PoE enabled device is one of a network device and a midspan device.

4. The PoE enabled device of claim 1, wherein negotiating with the PD occurs in response to receiving a message transmitted from the PD after the PD is allocated the predefined maximum power allotment.

5. The PoE enabled device of claim 1, wherein the PoE manager is configured to, upon determining the PSE does not have sufficient available power:
   perform a one-event classification of the PD; and
   after allocating a power level to the PD, negotiate with the PD to increase power allotted to the PD.

6. The PoE enabled device of claim 1, wherein the PoE manager is configured to perform the first and second classification events upon determining the PSE has sufficient available power.

7. The PoE enabled device of claim 1, wherein the PoE manager is configured to, upon determining the PSE does not have sufficient available power, cease transmitting power to the PD until the PSE has sufficient available power.

8. A method, comprising:
   determining that a PSE has sufficient available power to allocate a predefined maximum power allotment to a PD, wherein the PSE provides power to multiple PDs simultaneously;

performing a first and second classification event associated with the PD, based on the determination that the PSE has sufficient available power;

in response to determining the first and second classification events were successful, allocating the predefined maximum power allotment to the PD, wherein the predefined maximum power allotment is a predefined value providing a maximum amount of power that a PSE can allocate to any one PD; and after allocating the predefined maximum power allotment, negotiating with the PD to reduce power allotted to the PD.

9. The method of claim 8, wherein the first and second classification events are performed using layer 1 communication signals, wherein the negotiating with the PD is performed using layer 2 or greater communication signals.

10. The method of claim 8, further comprising:
after allocating the predefined maximum power allotment, receiving a message from the PD to begin negotiating the reduction of the power allotted to the PD.

11. The method of claim 8, further comprising, upon determining the PSE does not have sufficient available power:
performing a one-event classification of the PD; and
after allocating a power level to the PD, negotiating with the PD to increase power allotted to the PD.

12. The method of claim 8, wherein the first and second classification events are performed upon determining the PSE has sufficient available power.

13. The method of claim 8, further comprising, upon determining the PSE does not have sufficient available power, cease transmitting power to the PD until the PSE has sufficient available power.

14. A PoE enabled device, comprising:
PSE configured to provide DC power to a PD;
a PoE manager configured to:
determine that the PSE has sufficient available power to allot a maximum power allotment to the PD, wherein the maximum power allotment is a predefined value providing the maximum amount of power that the PSE can allocate to any one PD;
upon determining the PSE has sufficient available power:
perform a two-event classification of the PD,
allocate the maximum power allotment to the PD, and
negotiate with the PD to reduce power allotted to the PD; and
upon determining the PSE does not have sufficient available power:
perform a one-event classification of the PD, and
allocate a power level to the PD based on a class of the PD identified during the one-event classification.

15. The PoE enabled device of claim 14, wherein the two-event classification and one-event classification comply with IEEE standard 802.3at.

16. The PoE enabled device of claim 14, wherein the PoE manager is configured to, after allocating the power level to the PD, negotiate with the PD to increase power allotted to the PD using layer 2 or greater communication signals.

17. The PoE enabled device of claim 14, wherein the PSE is configured to power multiple PDs coupled to the PoE enabled device simultaneously.

18. The PoE enabled device of claim 14, wherein the two-event and one-event classifications are performed using layer 1 communication signals.

* * * * *